US012194525B2

(12) United States Patent
Battheu et al.

(10) Patent No.: US 12,194,525 B2
(45) **Date of Patent: *Jan. 14, 2025**

(54) SHEET METAL WORKING MACHINE

(71) Applicant: SALVAGNINI ITALIA S.P.A., Sarego (IT)

(72) Inventors: Claude Lucien Battheu, Sarego (IT); Ruggero Battaglia, Sarego (IT)

(73) Assignee: SALVAGNINI ITALIA S.P.A., Sarego (IT)

( * ) Notice: Subject to any disclaimer, the term of this patent is extended or adjusted under 35 U.S.C. 154(b) by 869 days.

This patent is subject to a terminal disclaimer.

(21) Appl. No.: 17/275,379

(22) PCT Filed: Sep. 30, 2019

(86) PCT No.: PCT/IB2019/058284
§ 371 (c)(1),
(2) Date: Mar. 11, 2021

(87) PCT Pub. No.: WO2020/070617
PCT Pub. Date: Apr. 9, 2020

(65) Prior Publication Data

US 2022/0097117 A1 Mar. 31, 2022

(30) Foreign Application Priority Data

Oct. 1, 2018 (IT) ........................ 102018000009060
Jun. 26, 2019 (IT) ........................ 102019000010191

(51) Int. Cl.
*B21D 28/00* (2006.01)
*B21D 28/24* (2006.01)
(Continued)

(52) U.S. Cl.
CPC ......... *B21D 28/002* (2013.01); *B21D 28/246* (2013.01); *F15B 1/02* (2013.01);
(Continued)

(58) Field of Classification Search
CPC .... F15B 1/00; F15B 1/02; F15B 11/16; F15B 2211/6651; F15B 2211/88;
(Continued)

(56) References Cited

U.S. PATENT DOCUMENTS 2,223,281 A 11/1940 Dinzl
3,738,569 A 6/1973 Killaly, Sr.
(Continued)

FOREIGN PATENT DOCUMENTS

AT 008 633 10/2006
CH 704 896 12/2012
(Continued)

OTHER PUBLICATIONS

Translation, DE 102009052531 A1 (Year: 2024).*
(Continued)

*Primary Examiner* — Nhat Chien Q Do
(74) *Attorney, Agent, or Firm* — Wenderoth, Lind & Ponack, L.L.P.

(57) ABSTRACT

A sheet metal working machine includes a hydraulic drive system to drive a plurality of working tools in a separate and independent manner. The hydraulic drive system includes a plurality of hydraulic cylinders provided with pistons defining thrust chambers and return chambers and associated with corresponding working tools, a reversible first pump connected to the thrust chambers and arranged to send fluid to, or to suck fluid from, at least one of the thrust chambers so as to move the respective piston and the working tool associated therewith, a plurality of valves interposed between the first pump and the thrust chambers of the respective hydraulic cylinders and activable to connect the first pump to the thrust chambers; a hydraulic accumulator connected to the return chambers and arranged for maintaining fluid at a defined preload pressure therein.

8 Claims, 3 Drawing Sheets

(51) Int. Cl.
*F15B 1/02* (2006.01)
*F15B 11/16* (2006.01)

(52) U.S. Cl.
CPC ..... *F15B 11/16* (2013.01); *F15B 2211/20515* (2013.01); *F15B 2211/20561* (2013.01); *F15B 2211/20576* (2013.01); *F15B 2211/27* (2013.01); *F15B 2211/625* (2013.01); *F15B 2211/6313* (2013.01); *F15B 2211/6651* (2013.01); *F15B 2211/6653* (2013.01); *F15B 2211/7052* (2013.01); *F15B 2211/7053* (2013.01); *F15B 2211/71* (2013.01); *F15B 2211/775* (2013.01); *F15B 2211/88* (2013.01)

(58) Field of Classification Search
CPC ...... F15B 2211/20515; F15B 2211/625; F15B 2211/6313; F15B 2211/7052; F15B 2211/7053; F15B 2211/71; F15B 2211/27; F15B 2211/20561; F15B 2211/775; F15B 2211/6653; F15B 2211/20576; B30B 15/163; B30B 15/16; B21D 28/002
USPC .......................................................... 83/639.1
See application file for complete search history.

(56) References Cited

U.S. PATENT DOCUMENTS

| | | | | |
|---|---|---|---|---|
| 3,863,488 | A | 2/1975 | Deordiev et al. | |
| 5,271,140 | A * | 12/1993 | Futamura | B21D 43/06 29/793 |
| 5,499,525 | A | 3/1996 | Kordak et al. | |
| 6,920,821 | B2 * | 7/2005 | Ariji | F15B 9/04 83/639.1 |
| 2007/0169618 | A1 | 7/2007 | Scheller | |
| 2013/0152661 | A1 * | 6/2013 | Imaeda | B30B 15/026 100/269.01 |
| 2015/0158262 | A1 | 6/2015 | Graf et al. | |
| 2016/0084279 | A1 | 3/2016 | Brahmer | |
| 2018/0266446 | A1 | 9/2018 | Arai | |
| 2022/0032356 | A1 * | 2/2022 | Battheu | B30B 15/163 |
| 2022/0097117 | A1 | 3/2022 | Battheu et al. | |

FOREIGN PATENT DOCUMENTS

| | | | | |
|---|---|---|---|---|
| CN | 102862316 | | 1/2013 | |
| CN | 203198289 | | 9/2013 | |
| CN | 105619875 | | 6/2016 | |
| CN | 106351893 | | 1/2017 | |
| CN | 206936108 | | 1/2018 | |
| CN | 107725506 | | 2/2018 | |
| DE | 102009052531 | A1 * | 5/2011 | B30B 15/161 |
| DE | 10 2011 116 964 | | 5/2012 | |
| DE | 10 2011 114 241 | | 12/2012 | |
| DE | 102011114241 | A1 * | 12/2012 | B30B 15/163 |
| DE | 10 2013 005 876 | | 10/2014 | |
| EP | 1 445 042 | | 8/2004 | |
| RU | 30 637 | | 7/2003 | |
| RU | 2 211 105 | | 8/2003 | |
| SU | 596332 | | 3/1978 | |
| WO | 2017/216737 | | 12/2017 | |

OTHER PUBLICATIONS

International Search Report issued Feb. 24, 2020 in International (PCT) Application No. PCT/IB2019/058284.
Office Action issued Jul. 26, 2022 in corresponding Chinese Patent Application No. 201980064196.1, with English-language translation.
Office Action issued Jan. 19, 2022 in corresponding Indian Patent Application No. 202127011404.
Office Action issued Jan. 21, 2022 in Indian Patent Application No. 202127011408.
Office Action issued Jul. 21, 2022 in Chinese Patent Application No. 201980064239.6, with English-language Search Report.
Office Action issued Dec. 22, 2021 in Russian Patent Application No. 2021110310, with English-language Search Report.
International Search Report issued Feb. 17, 2020 in International (PCT) Application No. PCT/IB2019/058280.

* cited by examiner

SHEET METAL WORKING MACHINE

The invention relates to sheet metal working machines and, in particular, it relates to a sheet metal working machine equipped with a hydraulic drive system adapted to drive a plurality of working tools in a separate and independent manner, for example punching tools and/or cutting tools.

Sheet metal working machines are known which are equipped with a multi-press or multi-tool punching apparatus and/or a single punching apparatus and/or a cutting or shearing apparatus, which can therefore perform a plurality of punching and cutting operations simultaneously and/or in sequence on the sheet metals to be machined.

The known multi-tool punching apparatuses comprise a plurality of punching tools or punches arranged adjacent and placed side by side on one or more rows, for example to form a parallel-row matrix structure, and driven linearly by respective presses constituted by linear actuators, typically hydraulic cylinders, in a separate and independent way to interact with the workpiece.

The multi-press punching apparatuses include all the tools necessary to execute in sequence the machinings required on the piece. In this way, it is not necessary to perform tool change operations during the production cycle, thus allowing to eliminate both stops for tool replacement (thus increasing the productivity of the machine) and automatic devices for setting up and replacing the tools (simplifying the structure of the machine).

Known cutting apparatuses or shearing units generally comprise two blades orthogonal to each other, independently movable along respective axes to perform cuts on the sheet metal. The blades or shears are driven by respective linear actuators, typically by hydraulic cylinders of adequate dimensions.

In combined machines, also called punching-shearing machines, which include a cutting apparatus and a multi-press punching apparatus, the latter one are often integrated into a single structure.

In order to correctly perform the punching and/or cutting machinings it is necessary to check the position, the displacement, or stroke, and the speed along a respective working axis of each tool, since these parameters depend on and are a function of the thickness and type of material of the workpiece and/or type of machining to be performed.

To drive and precisely control the movement of the punching and/or cutting tools, the known machines are provided with hydraulic drive systems capable of supplying and therefore driving in a separate and independent manner the hydraulic cylinders whose pistons are connected to and move the respective tools, so as to produce a single machining or a plurality of machinings on the piece in the same working phase.

Known hydraulic drive systems generally comprise one or more hydraulic pumps driven by an electric motor, which supply with a high-pressure (up to 300 bar) hydraulic fluid (oil) a supply circuit connected to each hydraulic cylinder by means of suitable by-pass and pressure regulation valves. By means of the aforementioned valves, it is therefore possible to select the hydraulic cylinder, that is the tool to be driven, the direction of movement of the piston of the cylinder, i.e. a working stroke or a return stroke of the piston/tool and the supply pressure of the hydraulic cylinder, i.e. the punching force that the tool exerts on the workpiece. The high pressure (up to 300 bar) with which the hydraulic pump feeds the supply circuit is calculated to ensure that one or more hydraulic cylinders of the punching apparatus exert maximum punching force on the workpieces.

However, in the usual working processes only a small part (about 20%) of the machinings performed on the pieces requires the application of the maximum punching or cutting force, that is the maximum supply pressure for the hydraulic cylinders, the normally required supply pressure being much smaller (60-100 bar).

A disadvantage of the machines provided with the aforementioned hydraulic drive systems therefore lies in the high power consumption (necessary for pumping the oil in the high-pressure supply circuit) and in the overall low power efficiency (the oil pressure must in fact be reduced in most machinings).

Another disadvantage lies in the fact that due to the high supply pressure and thermal dissipations due to the pressure reduction in the control valves of the hydraulic cylinders, the oil heats up and must therefore be appropriately cooled by cooling means, which make the machine more complex and expensive.

An object of the present invention is to improve the known sheet metal working machines and in particular the machines provided with a plurality of working tools to be driven in a separate and independent manner, for example punching tools and/or cutting tools.

Another object is to provide a machine having low power consumption and high power efficiency.

A further object is to provide a machine which allows the working tools to perform the working processes, for example punching and cutting, in an optimal manner, in particular capable of driving and controlling the position, displacement and speed of each tool along a respective working axis in a precise and accurate way.

A first aspect of the invention provides a sheet metal working machine according to claim 1.

A second aspect of the invention provides a method for driving working tools in a sheet metal working machine.

The invention can be better understood and implemented with reference to the attached drawings which illustrate some exemplifying and non-limiting embodiments thereof, wherein.

Figure 1:
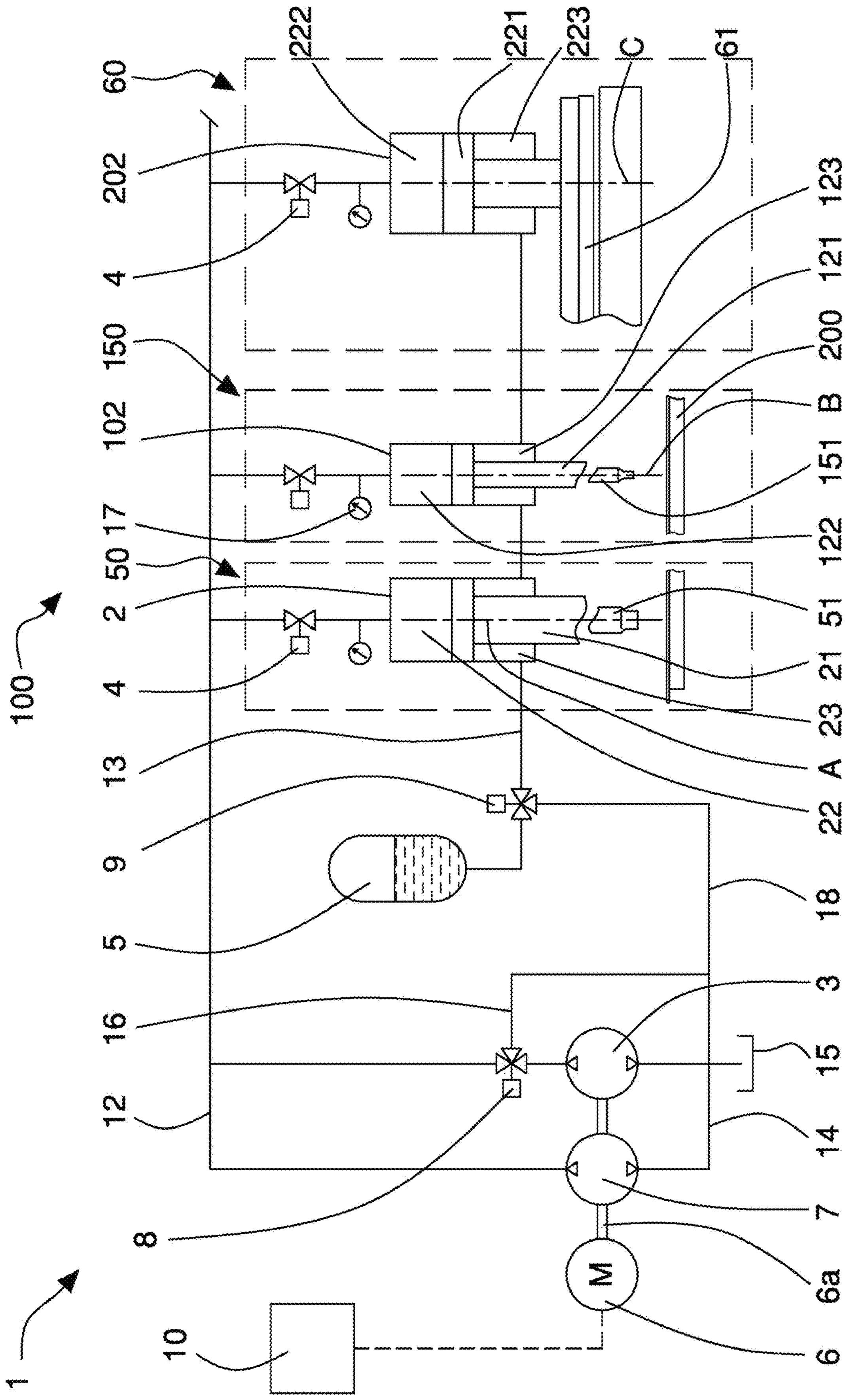
FIG. 1 is a schematic and partial view of a sheet metal working machine provided with a hydraulic drive system for moving a plurality of working tools driven by respective hydraulic cylinders.

With reference to FIG. 1, a sheet metal working machine 100 according to the invention is schematically and partially illustrated, which comprises a hydraulic drive system 1 adapted to drive a plurality of working tools 51, 151, 61 of the aforementioned machine 100 in a separate and independent manner along respective working axes A, B, C and performing respective machinings on at least one piece 200.

In particular, in the embodiment illustrated in the figures and described below, the machine 100 is, for example, a combined punching and cutting machine which comprises a multi-press punching apparatus 50, a single punching apparatus 150 and a cutting apparatus 60 and the hydraulic drive system 1 is arranged to drive in a separate and independent manner a plurality of punching working tools or punching tools 51 of the multi-press punching apparatus 50, a single punching working tool or punching tool 151 of the single punching apparatus 150 and one or more cutting working tools or cutting tools 61 of the cutting apparatus 60.

The machine 100 can also be a punching machine provided with the multi-press punching apparatus 50 only.

The punching tools 51 of the multi-press punching apparatus 50, of the known type, only one of which illustrated in the figures for ease of representation, are for example arranged on several rows side by side so as to form a matrix structure of punching tools 51.

The cutting apparatus 60 or shearing unit, of a known type, comprises, for example, two blades 61 orthogonal to each other, independently movable along respective axes to make cuts on the sheet metal, only one of which is illustrated for ease of representation in the figures.

The multi-press punching apparatus 50, the single punching apparatus 150 and the cutting apparatus 60 can work in sequence on the same piece 200 or on two or more pieces 200 simultaneously.

The hydraulic drive system 1 comprises a plurality of hydraulic cylinders or jacks 2, 102, 202 each of which is associated and arranged to drive a respective working tool 51, 151, 61. Each hydraulic cylinder comprises a respective piston 21, 121, 221 which forms inside the hydraulic cylinder 2, 102, 202 a thrust chamber 22, 122, 222 and a return chamber 23, 123, 223 and is associated with the corresponding working tool 51, 151, 61 to move it along a respective working axis A, B, C. More precisely, the piston 21, 121, 221 comprises a main body sliding inside the respective hydraulic cylinder 2, 102, 202 to form the two chambers of variable volume and a stem which protrudes from the hydraulic cylinder 2, 102, 202 and is connected to the corresponding working tool 51, 151, 61 through connecting means, known and not shown in the figures.

With reference to the embodiment of FIG. 1, the hydraulic drive system 1 comprises a plurality of first hydraulic cylinders 2 (of which only one illustrated) for driving the plurality of punching tools 51 of the multi-press punching apparatus 50. Each first hydraulic cylinder 2 is provided with a respective first piston 21 which forms within the aforementioned first hydraulic cylinder 2 a first thrust chamber 22 and a first return chamber 23 and is associated with the corresponding punching tool 51 to move it along a respective first working axis A. The hydraulic drive system 1 further comprises a second hydraulic cylinder 102 for driving a single punching tool 151 of the single punching apparatus 150. The second hydraulic cylinder 102 is provided with a respective second piston 121 which forms within the second hydraulic cylinder 102 a second thrust chamber 122 and a second return chamber 123 and is associated with the corresponding punching tool 151 to move it along a respective second working axis B.

Finally, the hydraulic drive system 1 comprises at least one pair of third hydraulic cylinders 202 (of which only one is illustrated) for driving two cutting tools 61 of the cutting apparatus 60. Each third hydraulic cylinder 202 is provided with a respective third piston 221 which forms within the third hydraulic cylinder 202 a third thrust chamber 222 and a third return chamber 223 and is associated with the corresponding punching tool 61 to move it along a respective third working axis C.

The hydraulic drive system 1 further comprises a first pump 3 connected to the thrust chambers 22, 122, 222 of the hydraulic cylinders 2, 102, 202, in particular by means of a supply circuit 12 formed by a plurality of supply ducts. The first pump 3 of the reversible type is arranged to send fluid, in particular oil, at a supply pressure $P_A$ in one or more of said thrust chambers 22, 122, 222 so as to push the respective pistons 21, 121, 221 along a working direction and allowing the working tools 51, 151, 61 associated therewith to interact with the piece 200, in a driving phase, or to suck fluid from the thrust chambers 22, 122, 222 to allow the respective pistons 21, 121, 221 to move along a return direction, opposite to the working direction, and to the working tools 51, 151, 61 to disengage and move away from the piece 200, in a return phase. In particular, in the driving phase the first pump 3 sends oil to a supply pressure $P_A$ which is a function of a desired force which the working tools must exert on the piece 200 to perform the required machining.

The hydraulic drive system 1 comprises a fluid or oil reservoir 15, at atmospheric pressure, which is connected to a mouth of the first pump 3 via a discharge circuit 14, the other mouth of the first pump 3 being connected to the hydraulic cylinders 2, 102, 202 through the supply circuit 12. In the driving phase, the first pump 3 draws oil from the reservoir 15 and sends it pressurized to the hydraulic cylinders 2, 102, 202; in the return phase, the first pump 3 pours into the reservoir 15 the fluid sucked by the hydraulic cylinders 2, 102, 202.

The hydraulic drive system 1 also includes a plurality of valves 4, in particular inserted in the supply circuit 12, each of which is associated with a respective hydraulic cylinder 2, 102, 202, interposed between the first pump 3 and the thrust chamber 22, 122, 222 of the hydraulic cylinder 2, 102, 202 and activable in opening to put the first pump 3 in flow connection with the thrust chamber 22, 122, 222 so as to drive the hydraulic cylinder 2, 102, 202 and the relevant working tool 51, 151, 61 in the working direction.

A hydraulic or pressurized accumulator 5 is connected to the return chambers 23, 123, 223 of the hydraulic cylinders 2, 102, 202, in particular by means of a return circuit 13 formed by a plurality of return ducts. The hydraulic accumulator 5, of a known type and therefore not described further in detail, is arranged to keep the fluid at a defined preload pressure in the return chambers 23, 123, 223, in particular to move along the return direction one or more pistons 21, 121, 221 of respective hydraulic cylinders 2, 102, 202 which are selectively driven by activating the corresponding valves 4.

It should be noted that the fluid preload pressure in the return chambers 23, 123, 223 of the hydraulic cylinders 2, 102, 202 confers greater rigidity to the latter ones and to the supply circuit 12 and return circuit 13, i.e. to the entire hydraulic drive system 1 which is in this way more reactive and precise in the movements of the pistons 21, 121, 221 and therefore of the working tools 51, 151, 61 during the machinings performed on the piece 200.

It should also be noted that, in each hydraulic cylinder 2, 102, 202, the force that the working tool 51, 151, 61 is able to exert on the piece 200 is given by the difference between a thrust force in the working direction obtained in the thrust chamber 22, 122, 222 from the fluid at the supply pressure acting on the piston 21, 121, 221 and an opposite contrast force in the return direction obtained in the return chamber 23, 123, 223 from the fluid to the preload pressure acting on the piston 21, 121, 221.

The hydraulic drive system 1 comprises an electric motor 6 controlled by a control unit 10 of the machine 100 and arranged to drive the first pump 3 of the reversible type in both rotation directions and in such a way that the first pump 3 delivers a defined flow rate of pressurized fluid. More precisely, the control unit 10 regulates the operation of the electric motor 6, in particular by varying the rotation torque, speed and acceleration of the motor shaft 6*a* which drives the first pump 3 according to the working conditions, such as for example the number of working tools 51, 151, 61 (i.e. hydraulic cylinders) to be driven, the force to be exerted on the workpiece 200 (i.e. oil supply pressure to the hydraulic cylinders). For this purpose, the hydraulic drive system 1 comprises a plurality of pressure sensors 17 inserted in the supply circuit 12, each of which is associated with a respective hydraulic cylinder 2, 102, 202 and capable of measuring a pressure of the fluid in the thrust chamber 3, 103, 203. The pressure sensors 17 are connected to the control unit 10 to send to it signals relating to the detected pressures.

In the embodiment shown in the figures, the hydraulic drive system 1 of the machine 100 of the invention comprises a second pump 7, also of the reversible type, coupled and connected to the first pump 3, in particular by means of a transmission shaft and substantially identical to the first pump 3. The two pumps 3, 7 are driven by the same electric motor 6 controlled by the control unit 10 so as to rotate together at the same speed and deliver a defined flow rate of pressurized oil to the hydraulic cylinders 2, 102, 202.

In a variant of the machine 100 of the invention not shown in the figures, the first pump 3 and the second pump 7 of the hydraulic drive system 1 are integrated in a single pump provided with two combined pumping units.

A first differential valve 8 is interposed between the second pump 7 and the thrust chambers 22 of the hydraulic cylinders 2, 102, 202 and activable when the supply pressure $P_A$ exceeds a first working pressure $P_1$ in at least one of the thrust chambers 22, 122, 222 so as to connect the second pump 7 to the oil reservoir 15 and by-pass or place into recirculation the second pump 7 and allow to transfer all the power of the electric motor 6 to the first pump 3 which is thus able to push and compress the oil at higher pressure values. The first differential valve 8 is for example a three-way valve inserted in the supply circuit 12 and connected to the reservoir 15 via a first discharge duct 16. The first differential valve 8 is for example controlled and activated by the control unit 10 on the basis of the pressure signals sent by the pressure sensors 17. Alternatively, the first differential valve 8 can be a servo-valve driven by a pilot valve activated by the pressure of the fluid in the supply circuit 12.

The hydraulic drive system 1 further comprises a second differential valve 9 interposed between the hydraulic accumulator 5 and the return chambers 23, 123, 223 of the hydraulic cylinders 2, 102, 202 and activable when the supply pressure $P_A$ exceeds a second working pressure $P_2$ in at least one of the thrust chambers 22, 122, 222 so as to connect the return chambers 23, 123, 223 to the reservoir 15 and put the latter into discharge, i.e. at atmospheric pressure. In this way, although the supply pressure $P_A$ of the fluid in the thrust chambers 22, 122, 222 remains constant, the punching and/or cutting force increases as the pressure in the return chambers 23, 123, 223 decreases to the atmospheric value. It is therefore possible in this way to contain the value of the supply pressure $P_A$ and reduce power consumption of the first pump 3.

The value of the second working pressure P2 is greater than that of the first working pressure P1.

The second differential valve 9 is, for example, a three-way valve inserted in the return circuit 13 and connected to the reservoir 15 via a second discharge duct 18. The second differential valve 9 is for example controlled and activated by the control unit 10 on the basis of the pressure signals sent by the pressure sensors 17. Alternatively, the second differential valve 9 can be a servo-valve driven by a pilot valve activated by the pressure of the fluid in the supply circuit 12.

Figure 2:
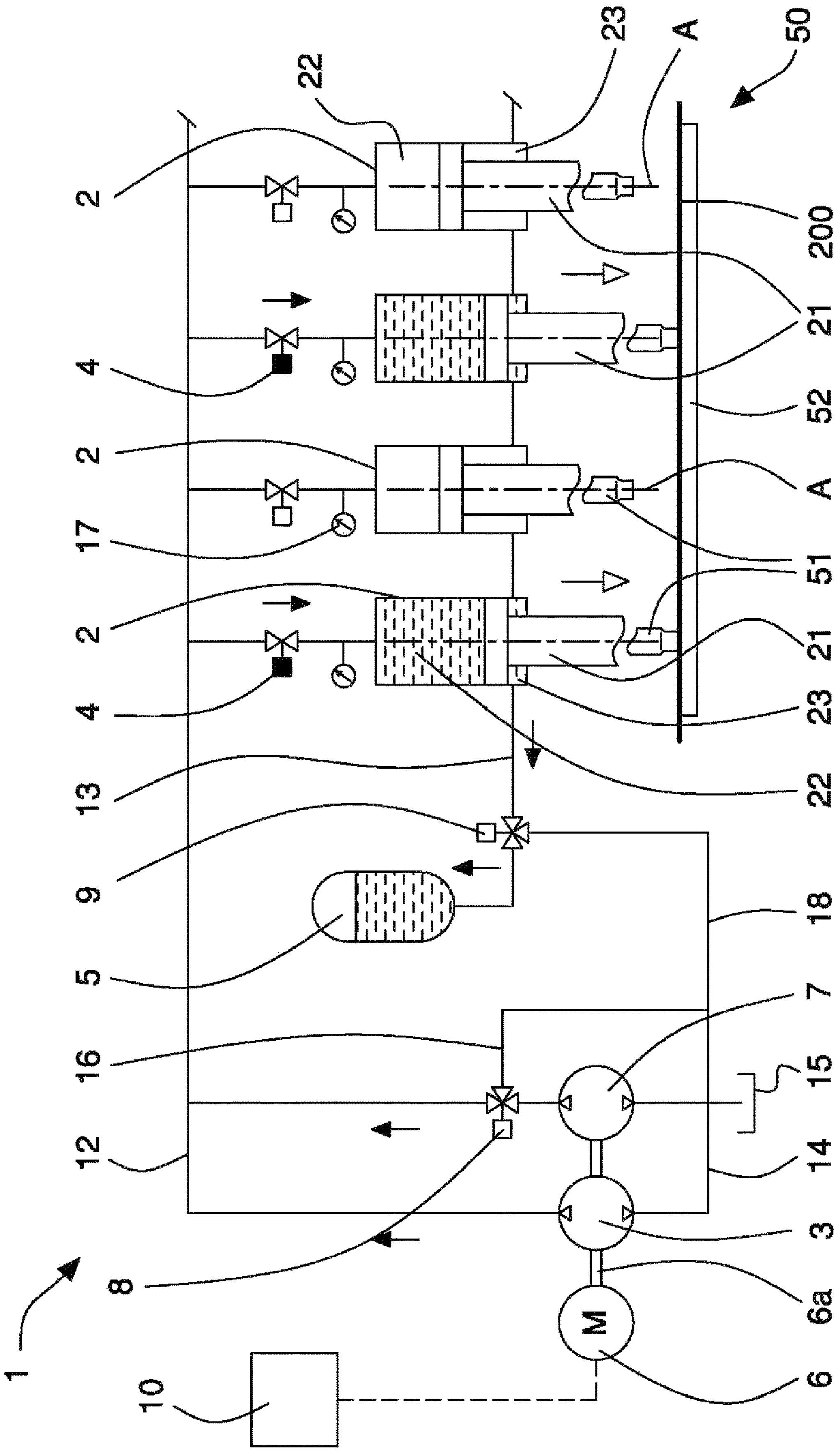
FIG. 2 is a schematic view like that of FIG. 1 which illustrates the machine and the hydraulic drive system in a working configuration in which a hydraulic cylinder is driven to move a respective working tool on a workpiece.

The operation of the sheet metal working machine 100 of the invention provided with the hydraulic drive system 1 provides for moving the tool or the working tools 51, 151, 61 necessary to perform the required machinings on the piece 200. For example, in the exemplary working configuration of FIG. 2, the hydraulic drive system 1 is controlled to move one of the plurality of punching tools 51 of the multi-press punching apparatus 50 by driving the respective first hydraulic cylinder 2. The latter is driven by activating in opening the corresponding valve 4 and driving the first pump 3 and the second pump 7 in a first rotation direction so as to send pressurized oil to the first thrust chamber 22. More precisely, the electric motor 2 is controlled by the control unit 10 so as to rotate the pumps in the first rotation direction with a defined speed and torque so that the pumps 3, 7 deliver a stable flow rate of oil at a supply pressure $P_A$ which is related to the force (in this case of punching) to be exerted with the tool on the piece 200, i.e. by the resistance that the latter opposes to the machining, in particular punching.

The hydraulic drive system 1 is also capable of simultaneously moving multiple tools of the plurality of punching tools 51 of the multi-press punching apparatus 50 by driving the respective first hydraulic cylinders 2, or of driving the single punching tool 151 of the single punching apparatus 150 by driving the second hydraulic cylinder 102 or even of driving at least one cutting tool 61 of the cutting apparatus 60 by driving the respective third hydraulic cylinder 202, the operation being the same as the one described below for the single punching tool 51 of the multi-press punching apparatus 50.

Since the (punching or cutting) force, which depends on the type of tool used (shape, size, . . . ), on the specific machining to be performed (drilling, cutting, deformation, . . . ) and on the material of the piece 200, can vary, in particular increase during performance of the machining, in general also the supply pressure $P_A$ can vary (increase) inside the thrust chambers 22, 122, 222, thus causing an increase in the torque or power that the electric motor 6 must supply the pumps 3, 7 so that the latter ones supply the required supply pressure $P_A$. Once the machining has been performed on the piece 200, the punching tool 51 is disengaged and moved away from the latter by moving the first piston 21 of the first hydraulic cylinder 2 in the return direction. This is achieved by reversing the rotation direction of the electric motor 2 that is by rotating the pumps 3, 7 in a second rotation direction, opposite to the first rotation direction, so as to suck oil from the first thrust chamber 22 and convey it towards the reservoir 15. In this way, the pressure of the fluid in the first thrust chamber 22 is reduced (to a value close to that of the atmospheric pressure) allowing the fluid contained in the first return chamber 23 at the preload pressure (secured by the hydraulic accumulator 5) to push the first piston 21 in the return direction.

It should be noted that the use of the hydraulic accumulator 5 to move the pistons 21, 121, 221 in the return direction allows the hydraulic drive system 1 to be simplified and made more economical since it avoids the use of further valves to convey the fluid dispensed from the pumps 3, 7 to the return chambers 23, 123, 223. Moreover, the power consumption of the electric motor 6 and of the pumps 3, 7, substantially driven to connect the thrust chambers 22, 122, 222 to the reservoir 15, are minimum and lower than those that would be necessary for the pumps 3, 7 to move the pistons 21, 121, 221 in the return direction.

Figure 3:
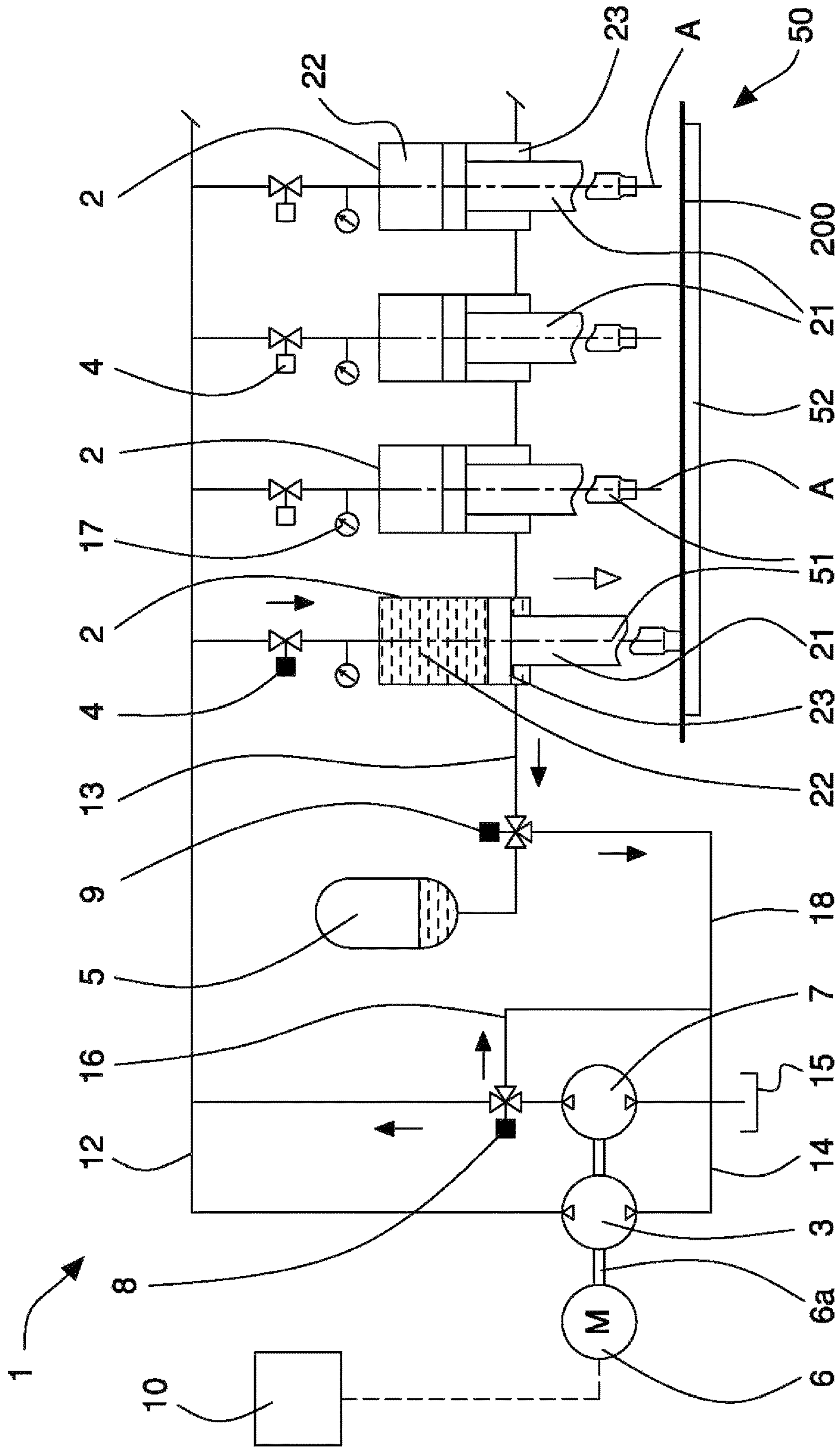
FIG. 3 is a schematic view like that of FIG. 1 which illustrates the machine and the hydraulic drive system in a further working configuration.

FIG. 3 illustrates another working or operation configuration of the hydraulic drive system 1 of the machine 100, which provides for the driving with a high punching force of a single punching tool 51 by activating the corresponding valve 4 which allows the pumps 3, 7 to send the pressurized fluid to the respective first hydraulic cylinder 2. In this configuration, in the stroke of the first piston 21 and of the relevant punching tool 51, the driving force or punching force increases progressively and with it the supply pressure $P_A$ inside the first thrust chamber 22. When the first working pressure $P_1$ is exceeded, the second pump 7 is placed into recirculation, i.e. it is connected in delivery to the oil reservoir 15 to send the fluid to the latter, activating the first differential valve 8. In this way, the second pump 7 is substantially excluded from operation and all the power of the electric motor 6 is supplied to the first pump 3 which can therefore guarantee the required increase in the supply pressure $P_A$. More precisely, it is possible to increase the supply pressure $P_A$, with a reduction in the flow rate of the fluid or the speed of the first piston 21, substantially without increasing the power of the electric motor 6 or increasing it only to a limited extent, thus allowing to contain power consumption of the whole hydraulic drive system 1 and of the machine 100.

Proceeding with the machining, if the driving force increases further and with it the supply pressure $P_A$ inside the thrust chamber 22, when the second working pressure $P_2$ is exceeded, the second differential valve 9 is activated, which puts in flow connection the first return chamber 23 with the reservoir 15, i.e., puts the return chamber 23 into discharge, at atmospheric pressure. In this way, the supply pressure $P_A$ of the fluid in the thrust chamber 22 can remain substantially constant (equal to the second working pressure $P_2$) or increase limitedly, but the effective force exerted on the first piston 21 in the working direction, i.e. the driving force, increases considerably since the pressure in the first return chamber 23 decreases to the atmospheric value, i.e., the contrast force of the piston in the return direction decreases. In other words, by discharging the second return chamber 23 by means of the second differential valve 9, it is possible to considerably increase the driving force without the need to increase the supply pressure $P_A$ or to increase the power of the electric motor 2, thereby allowing to contain power consumption of the machine 100.

Also in this case, once the machining on the workpiece 200 has been ended, the punching tool 51 is disengaged and moved away from the workpiece 200 by moving the first piston 21 in the return direction, in particular by rotating the pumps 3, 7 in the second rotation direction in such a way as to suck fluid from the first thrust chamber 22 and convey it towards the reservoir 15 and deactivating the second differential valve 9 so as to connect the first return chamber 23 to the hydraulic accumulator 5 again. In this way, the pressure of the fluid in the first thrust chamber 22 is reduced, allowing the fluid contained in the first return chamber 23 at the preload pressure (guaranteed by the hydraulic accumulator 5) to push the first piston 21 in the return direction.

An analogous operation can be obtained in the case in which the hydraulic drive system 1 of the machine 100 of the invention is arranged to simultaneously move several tools of the plurality of punching tools 51 of the multi-press punching apparatus 50 by driving the respective first hydraulic cylinders 2 or to move the single punching tool 151 of the single punching apparatus 150 by driving the second hydraulic cylinder 102 or even to drive at least one cutting tool 61 of the cutting apparatus 60 by driving the respective third hydraulic cylinder 202.

Thanks to the hydraulic supply system 1 of the sheet metal working machine 100 of the invention it is therefore possible to drive in a precise and accurate way, individually and independently, a plurality of working tools to perform one or more workings at the same time on the piece 200. More precisely, by activating the valves 4 it is possible to select one or more hydraulic cylinders 2, 102, 202 to be driven to move the respective working tools, and in particular at least one of a single punching tool 151 of a single punching apparatus 150, one or more cutting tools 61 of a cutting apparatus 60 and at least one of a plurality of punching tools 51 of a multi-press punching apparatus 50.

Adjusting the speed of rotation of the pumps 3, 7 by acting on the electric motor 6 controlled by the control unit 10, it is possible to adjust the flow rate and the supply pressure of the fluid in the thrust chambers 22, 122, 222 of the hydraulic cylinders 2, 102, 202 and therefore it is possible to precisely and accurately control the position, displacement and speed of the pistons 21 and the respective punching tools 51 along the working axes A, B, C. The precision and reactivity, i.e. the ability to react to the commands and the adjustments (changes in the flow rate and/or pressure of the fluid in the cylinders) of the hydraulic cylinders 2, 102, 202 and of the entire hydraulic drive system 1 of the invention are also ensured by the rigidity of the latter obtained, as already highlighted, connecting the return chambers 23, 123, 223 of the hydraulic cylinders 2, 102, 202 to the hydraulic accumulator 5 which maintains the fluid at a defined preload pressure.

The hydraulic accumulator 5 which allows to move the pistons 21, 121, 221 in the return direction also makes it possible to simplify and make less costly the hydraulic drive system 1 since it avoids the use of further valves to convey the fluid supplied by the pumps 3, 7 to the return chambers 23, 123, 223 and reduces the power consumption of the electric motor 6 and of the pumps 3, 7 which must not deliver pressurized fluid to move the aforementioned pistons 21, 121, 221 in the return direction.

The hydraulic drive system 1 of the machine 100 of the invention also has reduced power consumption and high power efficiency thanks to the use of the two differential valves 8, 9 which are activated when the supply pressure $P_A$ in the hydraulic cylinders 2, 102, 202 respectively reaches a first working pressure $P_1$ and a second working pressure $P_2$. More precisely, when the supply pressure $P_A$ exceeds the first working pressure $P_1$, the second pump 7 is placed into recirculation, that is connected in delivery to the oil reservoir 15, activating the first differential valve 8, so that the electric motor 6 in fact drives only the first pump 3. It is therefore possible to guarantee the required increase in the supply pressure $P_A$ without increasing the power and therefore the power consumption of the electric motor 6.

When the supply pressure $P_A$ exceeds the second working pressure $P_2$ the second differential valve 9, that puts the return chambers 23 and the reservoir 15 in flow connection, is also activated. Thus, the supply pressure $P_A$ of the fluid in the thrust chambers 22, 122, 222 can remain substantially constant or increase limitedly, since the effective force exerted on the piston 21, 121, 221 in the working direction, i.e. the punching/cutting force, increases by decreasing the pressure in the return chambers 23, 123, 223. The punching/cutting force is increased without the need to increase the supply pressure $P_A$ that is increase the power of the electric motor 2.

Thanks to the hydraulic drive system 1 the machine 100 of the invention is therefore more efficient in power consumption than the known sheet metal working machines.

It should also be noted that the use of the hydraulic drive system 1 which comprises a limited number of valves and a normal hydraulic accumulator is simple and economical and with reduced and compact dimensions and space requirements.

The method according to the invention for driving in a separate and independent manner a plurality of working tools 51, 151, 61 of a sheet metal working machine 100 provided with the hydraulic drive system 1 described above and illustrated in FIGS. 1 to 3 involves:

selecting at least one working tool 51, 151, 61 to be driven by activating in opening the respective valve 4 which is interposed between the first pump 3, of the reversible type and arranged to deliver fluid at the supply pressure $P_A$, and the hydraulic cylinder 2, 102, 202 acting on the selected working tool 51, 151, 61;

driving the first pump 3 in a first rotation direction in order to send the pressurized fluid into a thrust chamber 22, 122, 222 of the hydraulic cylinder 2, 102, 202 so as to push the piston 21, 121, 221 thereof along a working direction and enable the selected working tool 51, 151, 61 associated therewith to perform a machining on the piece 200;

once said machining has been performed, the first pump 3 is driven in a second rotation direction, opposite to the first rotation direction, in order to suck fluid from the thrust chamber 22, 122, 222, the piston 21, 121, 221 being pushed along a return direction by pressurized fluid sent to the return chamber 23, 123, 223 of the hydraulic cylinder 2, 102, 202 by a hydraulic accumulator 5, to enable the working tool 51, 151, 61 to disengage and move away from the piece 200.

The method also involves, during the driving of the first pump 3, driving in the first rotation direction also a second pump 7 of the reversible type, in particular coupled and connected to the first pump 3, in order to send fluid to the thrust chamber 22, 122, 222 of the hydraulic cylinder 2, 102, 202 up to a first working pressure $P_1$, over which the second pump 7 is placed into recirculation being connected to the reservoir 15, in which the fluid is sent, by activating the first differential valve 8.

During the driving of the first reversible pump 3, connecting the return chamber 23, 123, 223 of the hydraulic cylinder 2, 102, 202 to the reservoir 15, by activating the second differential valve 9, when the pressure of the fluid in the thrust chamber 22, 122, 222 exceeds a second working pressure P2, is also involved.

The invention claimed is:

1. A sheet metal working machine comprising a hydraulic drive system configured to drive a plurality of working tools of the sheet metal working machine independently to perform machining on a piece, said hydraulic drive system comprising:

a plurality of hydraulic cylinders, wherein each hydraulic cylinder is associated with a respective working tool and provided with a respective piston configured to define a thrust chamber and a return chamber inside said hydraulic cylinder and associated with the corresponding working tool for moving the working tool along a respective working axis;

a first pump of reversible type connected to said thrust chambers of said hydraulic cylinders and arranged to send fluid at a supply pressure to at least one of said thrust chambers so as to push said respective piston along a working direction and enable the working tool associated therewith to interact with the piece, or to suck fluid from at least one of said thrust chambers, to enable said respective piston to move along a return direction and the working tool to disengage and move away from the piece;

a plurality of valves, wherein each valve is associated with a respective one of said hydraulic cylinders, interposed between said first pump and said thrust chamber of said respective one of said hydraulic cylinders, and activable to put said first pump into flow connection with said thrust chamber so as to drive said hydraulic cylinder;

a hydraulic accumulator connected to said return chambers of said hydraulic cylinders and arranged for maintaining fluid at a defined preload pressure in said return chambers;

a second pump of reversible type coupled and connected to said first pump, wherein said first and second pumps are configured to be driven by a same electric motor controlled by a control unit of the sheet metal working machine and arranged to drive said first and second pumps in both rotation directions and such that said first and second pumps deliver a defined fluid flow rate at a defined supply pressure; and a first differential valve interposed between said second pump and said thrust chambers and activable when the supply pressure exceeds a first working pressure in at least one of said thrust chambers so as to connect said second pmp to a fluid reservoir.

2. The sheet metal working machine according to claim 1, wherein said hydraulic drive system further comprises said same electric motor.

3. The sheet metal working machine according to claim 1, wherein said hydraulic drive system further comprises a second differential valve interposed between said hydraulic accumulator and said return chambers and activable when the supply pressure exceeds a second working pressure in at least one of said thrust chambers so as to connect said return chambers to the fluid reservoir.

4. The sheet metal working machine according to claim 3, wherein the fluid reservoir is at atmospheric pressure.

5. The sheet metal working machine according to claim 1, wherein said hydraulic drive system further comprises a second differential valve interposed between said hydraulic accumulator and said return chambers and activable when the supply pressure exceeds a second working pressure in at least one of said thrust chambers so as to connect said return chambers to the fluid reservoir, wherein the second working pressure is higher than the first working pressure.

6. The sheet metal working machine according to claim 1, wherein said hydraulic drive system comprises said fluid reservoir from which fluid is sucked by at least said first pump when driven in a first rotation direction in order to send fluid at the supply pressure to said hydraulic cylinders and to which fluid is sent when said first pump is driven in a second rotation direction, opposite to the first rotation direction, in order to suck fluid from said hydraulic cylinders.

7. The sheet metal working machine according to claim 1, further comprising at least one among a multi-press punching apparatus, a single-press punching apparatus and a cutting apparatus including the plurality of working tools, wherein said hydraulic drive system is arranged to drive in a separate and independent manner at least one among a single punching working tool of said single-press punching apparatus, at least one cutting working tool of said cutting apparatus and one or more of a plurality of punching working tools of said multi-press punching apparatus.

8. The sheet metal working machine according to claim 1, wherein the fluid reservoir is at atmospheric pressure.

* * * * *